United States Patent
Gao et al.

(10) Patent No.: US 12,516,553 B2
(45) Date of Patent: Jan. 6, 2026

(54) LOCKING ACTUATOR FOR AUTOMOTIVE APPLICATIONS

(71) Applicant: KIEKERT AG, Heiligenhaus (DE)

(72) Inventors: Wenhong Gao, Zhengzhou (CN); Saxon Sun, Changshu (CN); Boan Zheng, Taicang (CN)

(73) Assignee: Kiekert AG, Heiligenhaus (DE)

( * ) Notice: Subject to any disclaimer, the term of this patent is extended or adjusted under 35 U.S.C. 154(b) by 61 days.

(21) Appl. No.: 18/683,048

(22) PCT Filed: Aug. 22, 2022

(86) PCT No.: PCT/IB2022/057832
§ 371 (c)(1),
(2) Date: Feb. 12, 2024

(87) PCT Pub. No.: WO2023/026163
PCT Pub. Date: Mar. 2, 2023

(65) Prior Publication Data
US 2025/0146333 A1     May 8, 2025

(30) Foreign Application Priority Data
Aug. 23, 2021 (CN) .......................... 202110968093.7

(51) Int. Cl.
*E05B 81/06* (2014.01)
*B60L 53/16* (2019.01)
(Continued)

(52) U.S. Cl.
CPC .............. *E05B 81/06* (2013.01); *B60L 53/16* (2019.02); *E05B 81/18* (2013.01); *E05B 81/34* (2013.01); *E05B 81/90* (2013.01); *E05B 83/28* (2013.01)

(58) Field of Classification Search
CPC .......... E05B 81/18; E05B 81/34; E05B 81/90; E05B 83/28; B60L 53/16
(Continued)

(56) References Cited

U.S. PATENT DOCUMENTS 4,226,136 A * 10/1980 Porter ................... E05F 15/697
                                                  74/606 R
5,022,690 A * 6/1991 Coltrin .................. E05B 63/121
                                                  49/56
(Continued)

FOREIGN PATENT DOCUMENTS

DE     102017123206 A1 * 4/2019 .............. B60L 53/16
DE     102019130396 A1     5/2021
(Continued)

OTHER PUBLICATIONS

International Search Report mailed Nov. 24, 2022, for priority International Application No. PCT/IB2022/057832.

*Primary Examiner* — Nathan Cumar
(74) *Attorney, Agent, or Firm* — Renner, Otto, Boisselle & Sklar, LLP

(57) ABSTRACT

A locking actuator for automotive applications which is equipped with a housing, further equipped with an electromotive drive arranged in the housing, and equipped with a locking element guided outward through an opening in the housing. The electromotive drive has at least one electric motor, an output element, an output gear meshing with the output element, and a gearwheel meshing with the output gear in order to act upon the locking element. According to the invention, a manually actuable emergency actuation element engaging the gearwheel is provided.

14 Claims, 3 Drawing Sheets

(51) Int. Cl.
*E05B 81/18* (2014.01)
*E05B 81/34* (2014.01)
*E05B 81/90* (2014.01)
*E05B 83/28* (2014.01)

(58) Field of Classification Search
USPC .......................................................... 292/2
See application file for complete search history.

(56) References Cited

U.S. PATENT DOCUMENTS

| | | | | |
|---|---|---|---|---|
| 8,317,534 | B2* | 11/2012 | Osawa | B60L 53/16 |
| | | | | 439/353 |
| 8,547,059 | B2* | 10/2013 | Kurumizawa | H01R 13/6397 |
| | | | | 320/111 |
| 12,098,583 | B2* | 9/2024 | Landskron | E05B 83/34 |
| 2007/0007055 | A1* | 1/2007 | Schmidt | H02K 15/125 |
| | | | | 74/421 A |
| 2012/0186309 | A1* | 7/2012 | Ishida | B60L 50/16 |
| | | | | 70/57 |
| 2012/0242095 | A1* | 9/2012 | Niwa | E05B 81/18 |
| | | | | 292/142 |
| 2013/0154402 | A1* | 6/2013 | Basavarajappa | H02K 7/06 |
| | | | | 310/20 |
| 2016/0144728 | A1* | 5/2016 | Harper | B60L 53/67 |
| | | | | 320/109 |

FOREIGN PATENT DOCUMENTS

| | | |
|---|---|---|
| DE | 102020101362 A1 | 7/2021 |
| WO | 2019068279 A1 | 4/2019 |

* cited by examiner

LOCKING ACTUATOR FOR AUTOMOTIVE APPLICATIONS

This application is a national phase of International Patent Application No. PCT/IB2022/057832 filed Aug. 22, 2022, which claims priority to Chinese Patent Application No. 2021 109 680 93.7 filed Aug. 23, 2021, each of which is hereby incorporated herein by reference in its entirety.

FIELD OF DISCLOSURE

The invention relates to a locking actuator for automotive applications, comprising a housing, further comprising an electromotive drive arranged in the housing, and comprising a locking element guided outward through an opening in the housing, the electromotive drive having at least one electric motor, an output gear meshing with the output element, and a gearwheel meshing with the output gear in order to act upon the locking element.

BACKGROUND OF DISCLOSURE

A locking actuator of the structure described at the outset is described, for example, in WO 2019/068279 A1 from the applicant. The locking actuator or the locking element which can be moved in this way, in conjunction with an electrical connection device for electric or hybrid motor vehicles in particular, ensures that a charging connector can be detachably anchored within a charging socket using the locking element. This has proven itself in principle.

In addition, such locking actuators can also be used in a different context in or on the motor vehicle. Either way, the electromotive drive is usually supplied with the required electrical energy using the battery on the motor vehicle side or an accumulator provided at this point. At this point there can be disruptions in the electrical energy supply, for example, if the battery in question no longer has a sufficient state of charge, for example following a longer idle time. In such a case, for example, a lock brought about using the locking actuator or its locking element cannot be canceled easily (any longer). This is where the invention comes in.

SUMMARY OF DISCLOSURE

The invention is based on the technical problem of developing such a locking actuator for automotive applications in such a way that emergency operation is possible.

To solve this technical problem, a generic locking actuator is characterized, within the scope of the invention, in that a manually actuable emergency actuation element engaging the gearwheel is provided.

Due to the recourse according to the invention to the manually actuatable emergency actuation element which engages the gearwheel, the relevant locking actuator can also be actuated at least manually if an electrical power supply for the electric motor has failed or is interrupted, since, in such a case, the gearwheel for actuating the locking element is moved using the manually actuable emergency actuation element that acts directly on the gearwheel. The emergency actuation can in principle be carried out both for emergency locking using the locking element and for emergency unlocking using the locking element.

According to the invention, the emergency actuation element is typically designed as an emergency unlocking element, i.e., it generally ensures that the locking element, which is in the locked state and extended from the housing in an exposed position, is returned to its unlocked and retracted position. As a result, a motor vehicle component which has previously been locked using the locking element can be released in a manual manner. This can be, by way of non-limiting example, a charging connector received in a charging socket. In general, however, other previously locked motor vehicle components can also be acted upon or opened (again) following the manual emergency actuation or emergency unlocking described.

For this purpose, the emergency actuation element is designed in two parts with a disk and flexible connecting means. The flexible connecting means can, for example, be a cable joined to the disk. The disk generally engages with a pin in a pin receptacle on the gearwheel.

In this way, any rotational movements transmitted to the disk using the flexible connecting means are transmitted to the gearwheel because the rotational movement of the disk by means of the pin engaging in the pin receptacle ensures that the gearwheel is entrained during the rotational movement of the disk.

In order to guide the flexible connecting means and advantageously the cable on the disk, the disk is usually equipped with a circumferential groove for engaging the relevant flexible connecting means. In addition, and according to a particularly advantageous embodiment, a guide for the connecting means is also provided. Overall, the guide ensures that the connecting means is, for the most part, brought tangentially to the disk or the circumferential groove of the disk.

It has proven to be particularly advantageous if the guide is designed in two parts having an inner guide and an outer guide. The inner guide is provided and formed in the interior of the housing. The overall design can be such that the inner guide is connected, for example, to a cover of the housing. Here, the invention is based on the knowledge that the housing is generally designed in two parts having a shell and a cover.

The outer guide generally engages in an opening in the housing by the intermediate positioning of a seal. Using the seal, the external guide and thus the flexible connecting means which is guided outward are sealed against the housing. This is particularly important in light of the fact that such locking actuators for automotive applications are typically placed inside a body, but not necessarily protected from dust or moisture.

The locking element generally has a tooth formation for engaging a gear on the output worm, i.e., the output worm is generally designed with the gear in question, which engages in the tooth formation of the locking element, so that corresponding rotations of the gear are converted into a linear movement of the locking element by engaging the gear in the tooth formation which generally extends in a straight line.

The locking element has a pin-like projection which engages through a seal in the opening in the housing. Using the seal, the pin-like projection is sealed off from the opening of the housing and prevents any spray water or, in general, moisture, dust, etc., from penetrating into the interior of the housing. This is of particular importance as the components located inside the housing, namely the output element, the output gear meshing with the output element and the disk as part of the emergency actuation element, are usually made of plastics material and are each plastics injection-molded parts. Such plastics injection-molded parts must in particular be protected from the ingress of dust in order to keep wear and tear to a minimum.

The housing consisting of the shell and cover is also typically made of plastics material. The same applies to the guide or the inner guide and the outer guide. The cable pulling through the external guide to the outside of the housing can, for example, be equipped with a handle connected to the cable to simplify its manual actuation. In fact, the cable is advantageously a Bowden cable with a Bowden cable core and a Bowden cable sleeve, the handle generally being connected to the Bowden cable core. As a result, the desired manual actuation of the gearwheel in the course of emergency actuation and in particular emergency unlocking can be carried out and implemented as described.

As a result, a locking actuator for automotive applications is made available that functions particularly securely and durably. This applies even if an electrical energy source for the electric motor has failed or if there is insufficient electrical power available, since, in such a case, the locking element can be actuated in an emergency and in particular unlocked in an emergency using the manually actuatable emergency actuation element. For this purpose, the emergency actuation element is typically equipped with the cable and the handle at the end, the manual actuation of which is transferred to the locking element.

All of this is implemented in connection with a sealed and encapsulated design of the housing, so that functional impairments are not to be feared even under unfavorable environmental conditions. In addition, the predominant design made of plastics material ensures low weight and low costs, and therefore the locking actuator according to the invention is particularly predestined for the automotive applications described.

BRIEF DESCRIPTION OF DRAWINGS

The invention is explained in greater detail below with reference to drawings, which show only one exemplary embodiment. In the drawings.

DETAILED DESCRIPTION

Figure 1:
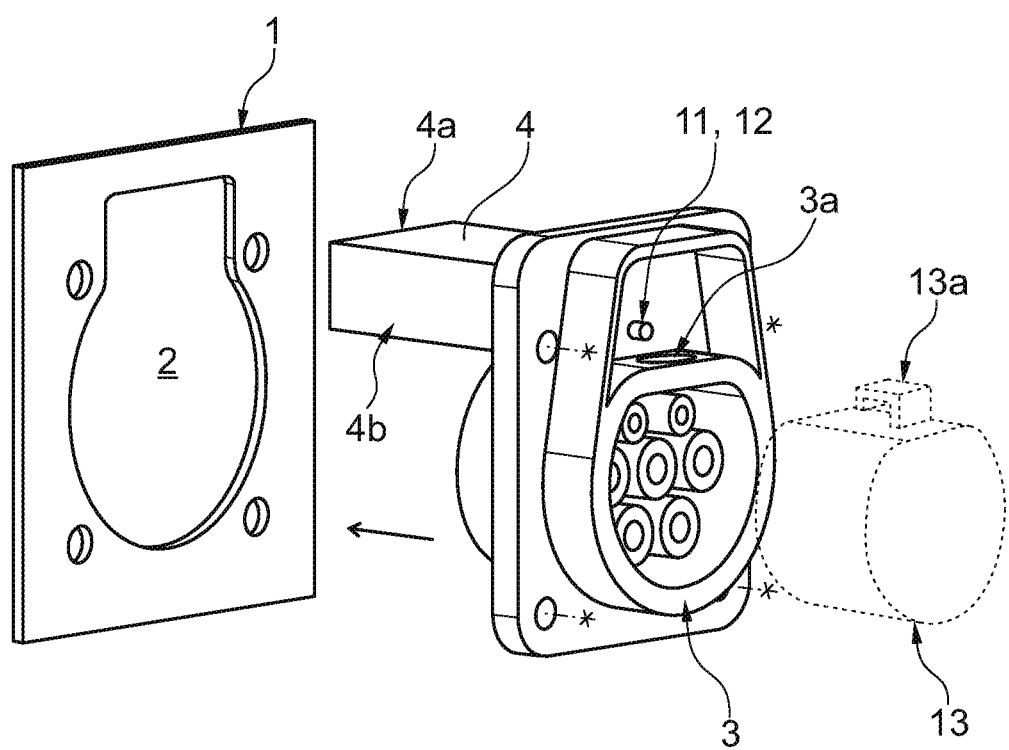
FIG. 1 schematically shows an electrical connection device in an overview in connection with the locking actuator according to the invention.

FIG. 1 shows an electrical connection device for, in particular, electric or hybrid motor vehicles. The electric or hybrid motor vehicle in question shows a section of a body 1 and an installation opening 2 in the body 1 for receiving a charging socket 3 and a housing 4. The housing 4 belongs to a locking actuator shown in more detail in FIGS. 2 and 3 and described below in more detail.

In addition, an electromotive drive 5 to 9, which is to be described in more detail below, can also be seen. The electromotive drive 5 to 9 is used to generate adjustment movements of a locking element 11, 12. The locking element 11, 12 ensures that a charging connector 13, only indicated in FIG. 1, can be detachably anchored in the charging socket 3. For this purpose, the charging connector 13 may be connected to a charging column (not shown) as part of a charging infrastructure, which is not shown in detail.

Figure 2:
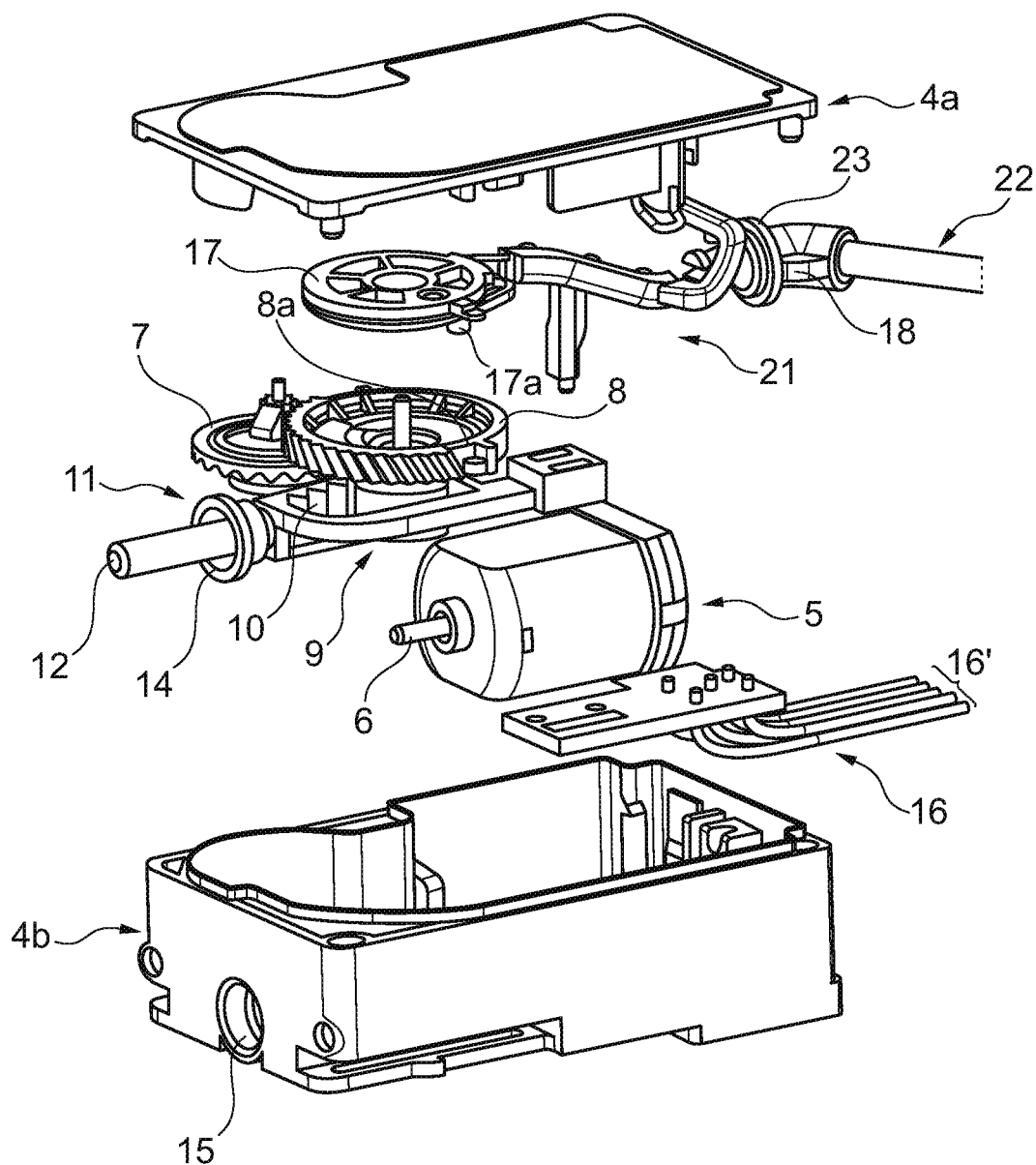
FIG. 2 shows the locking actuator in a perspective exploded view and FIG. 3 shows the object of FIG. 2 in the assembled and opened state of the housing.

On the basis of FIG. 2, it can be seen that the electromotive drive 5 to 9 is initially composed of an electric motor 5 and an output element 6 attached to an output shaft of the electric motor 5. In the present exemplary embodiment, the output element 6 is designed as a crown gear stage having an evoloid toothing. A high gear ratio can be achieved by means of the evoloid toothing. In alternative embodiments, the output element 6 can have a different toothing, or instead of being designed as a crown gear stage, for example, be designed as an output worm. The output element 6 meshes with an output gear 7, which in turn drives a gearwheel 8. The gearwheel 8 engages with a gear 9 connected on the underside according to the exemplary embodiment in a straight tooth formation 10 on the locking element 11, 12.

The locking element 11, 12 is in turn composed of a base 11 having the tooth formation 10 and a pin-like projection 12. The pin-like projection 12 extends through a seal 14 in an opening 15 of the housing 4. In fact, the housing 4 is composed of a shell 4b and a cover 4a, as can be seen in particular from the exploded view according to FIG. 2.

In addition to the electromotive drive 5 to 9 and the locking element 11, 12, a circuit board 16 having a control unit (not expressly shown) located on it for controlling the electromotive drive 5 to 9 is also arranged in the interior of the housing 4. The circuit board 16 is equipped with supply lines 16' which are led to the outside of the housing 4. In addition, an emergency actuation element 17, 18 that engages the gearwheel 8 and can be actuated manually is arranged in the housing 4.

Figure 3:
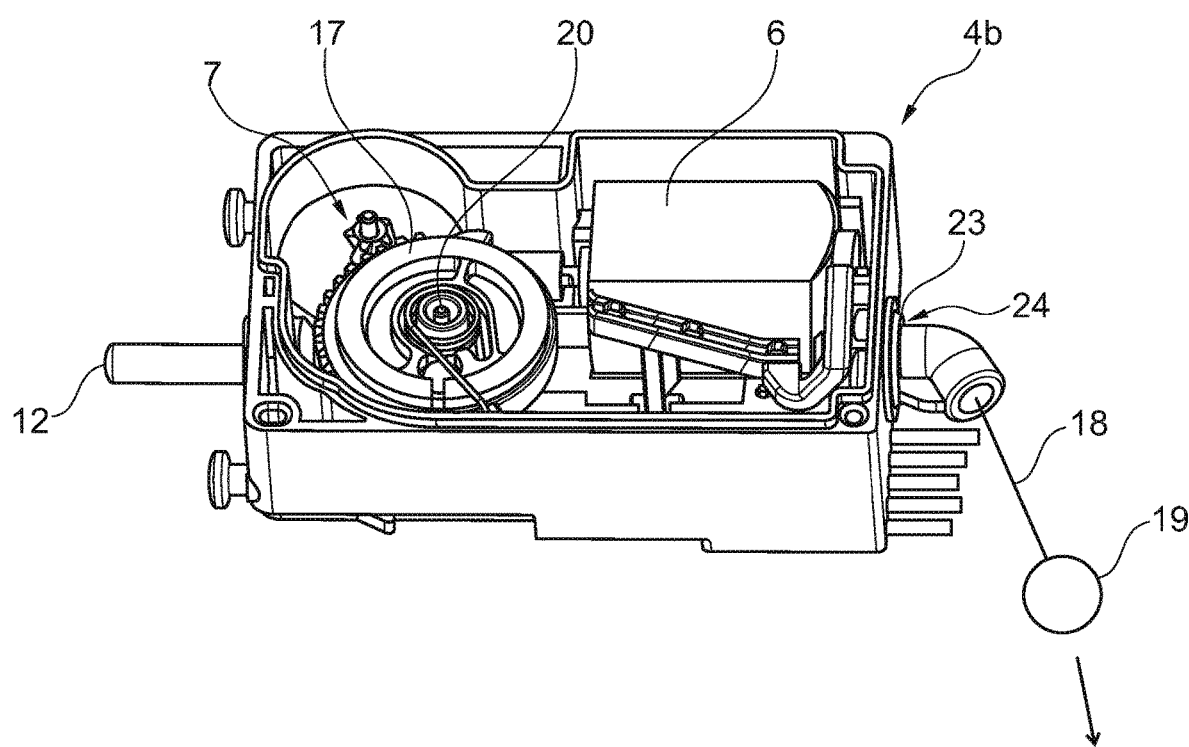

When comparing FIGS. 2 and 3, it can be seen that the emergency actuation element 17, 18 according to the exemplary embodiment is formed in two parts having a disk 17 and a flexible connecting means 18. According to the exemplary embodiment, the flexible connecting means 18 is designed as a cable 18 connected to the disk 17. The cable 18 may be a Bowden cable with a Bowden cable core and a Bowden cable jacket. According to the exemplary embodiment, an indicated manual handle 19 is connected to the cable 18 or its Bowden cable core, by means of which the cable 18 and thus the emergency actuation element 17, 18 as a whole can be actuated manually. Tensile loading which can be transmitted to the disk 17 via the cable 18 and is indicated by an arrow in FIG. 3 may correspond to this. For this purpose, the disk 17 is equipped with a circumferential groove for the engagement of the flexible connecting means or the cable 18. In addition, the disk 17 has a pin 17a provided radially and circumferentially on the underside, which engages in a pin receptacle 8a on the gearwheel 8. As a result, when the cable 18 is subjected to tension in the direction indicated in FIG. 3 for example, accompanying rotations of the disk 17 in the clockwise direction indicated in FIG. 3 result in the gearwheel 8 being engaged between the pin 17a and the pin receptacle 8a during this clockwise rotation of the disk 17. In fact, the disk 17 and the gearwheel 8 are coaxially mounted with respect to a common axis or axis of rotation 20 to one another.

When comparing FIGS. 2 and 3, it can finally be seen that a guide 21, 22 for the flexible connecting means or the cable 18 is provided and implemented. The guide 21, 22 is formed in two parts having an inner guide 21 and an outer guide 22. The inner guide 21 may be connected to the cover 4a of the housing 4. In addition, the inner guide 21 ensures that the flexible connecting means 18 or the cable 18 is properly guided inside the housing 4, starting from an opening 24 in the housing 4 or its shell 4b equipped with a seal 23. The outer guide 22 for the flexible connecting means or the cable 18 also extends from this opening 24. The outer guide 22 engages in the opening 24 of the housing 4 by the intermediate positioning of said seal 23.

It can be seen that the locking element 11, 12 with its pin-like projection 12 projects out of the housing 4 with a length predetermined by the electromotive drive 5 to 9 and, in the exemplary embodiment, ensures that the charging connector 13 is locked with respect to the charging socket 3. Of course, the projection 12 or the locking element 11, 12 can also be used for other types of locking. In any case, the locking can in particular be canceled in the event that the electrical energy supply of the electric motor 5 and thus of the entire electromotive drive 5 to 9 has failed. For this purpose, it is only necessary to act on the handle 19 at the end of the flexible connecting means or the cable 18, for example to achieve unlocking and to transfer the locking element 11, 12 or the projection 12 back from its exposed position shown in FIG. 3 into a retracted position.

LIST OF REFERENCE SIGNS

Body 1
Installation opening 2
Charging socket 3
Housing 4
Cover 4*a*
Shell 4*b*
Electric motor 5
Electromotive drive 5, 6, 7, 8, 9
Output worm 6
Output gear 7
Gearwheel 8
Pin receptacle 8*a*
Tooth formation 10
Base 11
Locking element 11, 12
Pin-like projection 12
Charging connector 13
Seal 14
Opening 15
Disk 17
Pin 17*a*
Connecting means 18
Cable 18
Emergency actuation element 17, 18
Manual handle 19
Axis of rotation 20
Inner guide 21
Outer guide 22

The invention claimed is:

1. A locking actuator for automotive applications, comprising:
a housing,
an electromotive drive arranged in the housing,
a locking element guided outward through an opening in the housing,
the electromotive drive having at least one electric motor, an output element, an output gear meshing with the output element, and a gearwheel meshing with the output gear in order to act upon the locking element, and
a manually actuable emergency actuation element that engages with the gearwheel,
wherein the emergency actuation element comprises two parts including a disk and a flexible connection.

2. The locking actuator according to claim 1, wherein the flexible connection comprises a cable joined to the disk.

3. The locking actuator according to claim 1, wherein the locking element includes a pin, and the gearwheel has a pin receptacle and the disk engages with the pin in the pin receptacle on the gearwheel.

4. The locking actuator according to claim 2, wherein the flexible connection includes a handle connected to the cable for manual actuation of the emergency actuation element.

5. The locking actuator according to claim 2, wherein the cable comprises a Bowden cable including a cable core and a cable sleeve.

6. The locking actuator according to claim 1, wherein the disk has a circumferential groove that engages with the flexible connection.

7. The locking actuator according to claim 1, further comprising a guide for the flexible connection.

8. The locking actuator according to claim 7, wherein the guide comprises two parts including an inner guide and an outer guide.

9. The locking actuator according to claim 8, further comprising a seal, wherein the outer guide engages in the opening in the housing by intermediate positioning of the seal.

10. The locking actuator according to claim 8, wherein the inner guide is formed in the interior of the housing.

11. The locking actuator according to claim 10, wherein the housing includes two parts including a shell and a cover, and the inner guide is formed in the shell.

12. The locking actuator according to claim 1, wherein the locking element has a tooth formation for engaging a gear on the gearwheel.

13. The locking actuator according to claim 1, further comprising a seal, wherein the locking element has a pin projection and engages through the seal in the opening in the housing by the pin projection.

14. The locking actuator according to claim 1, further comprising a circuit board positioned in an interior of the housing and that is electrically connected to the electromotive drive.

* * * * *